United States Patent [19]

Silver

[11] 4,082,915

[45] Apr. 4, 1978

[54] ELECTRICAL JUNCTION BOX

[76] Inventor: Harry Silver, 1844 Meadowbrook Rd., Abington, Pa. 19001

[21] Appl. No.: 753,068

[22] Filed: Dec. 21, 1976

[51] Int. Cl.² .............................................. H02G 3/08
[52] U.S. Cl. ................................. 174/51; 174/65 R; 285/128
[58] Field of Search .................. 174/65 R, 51, 53, 58; 220/3.2, 3.3, 3.4, 3.5, 3.6; 285/128, 129

[56] References Cited

U.S. PATENT DOCUMENTS

| | | | |
|---|---|---|---|
| 2,352,913 | 7/1944 | Parker | 174/65 R |
| 3,084,958 | 4/1963 | Appleton | 174/65 R X |
| 3,112,938 | 12/1963 | Karlin | 174/65 R X |
| 3,344,502 | 10/1967 | Maier | 174/65 R X |
| 3,676,571 | 7/1972 | Rubinstein | 174/65 R |
| 3,816,638 | 6/1974 | Appleton | 174/51 |

*Primary Examiner*—J. V. Truhe
*Assistant Examiner*—D. A. Tone

*Attorney, Agent, or Firm*—Caesar, Rivise, Bernstein & Cohen, Ltd.

[57] ABSTRACT

An electrical connection box. The box comprises a hollow, molded or cast housing having plural walls, at least one of which including an opening configured to receive an electrical conductor therethrough. Tightenable clamping means are disposed adjacent to the opening for clamping the conductor in place. The clamping means includes a contact shoe which is integrally formed with the housing and which is breakable therefrom at a break point when the conductor is to be clamped. The breakage of the shoe from the housing enables the shoe to be brought into clamping engagement with the conductor. In one embodiment of the invention the clamping means is mounted inside the box. In another embodiment the clamping means is mounted outside the box. The openings for the conductor can be configured for either ROMEX or BX type cables. Breakaway mounting flanges are provided on the box.

14 Claims, 8 Drawing Figures

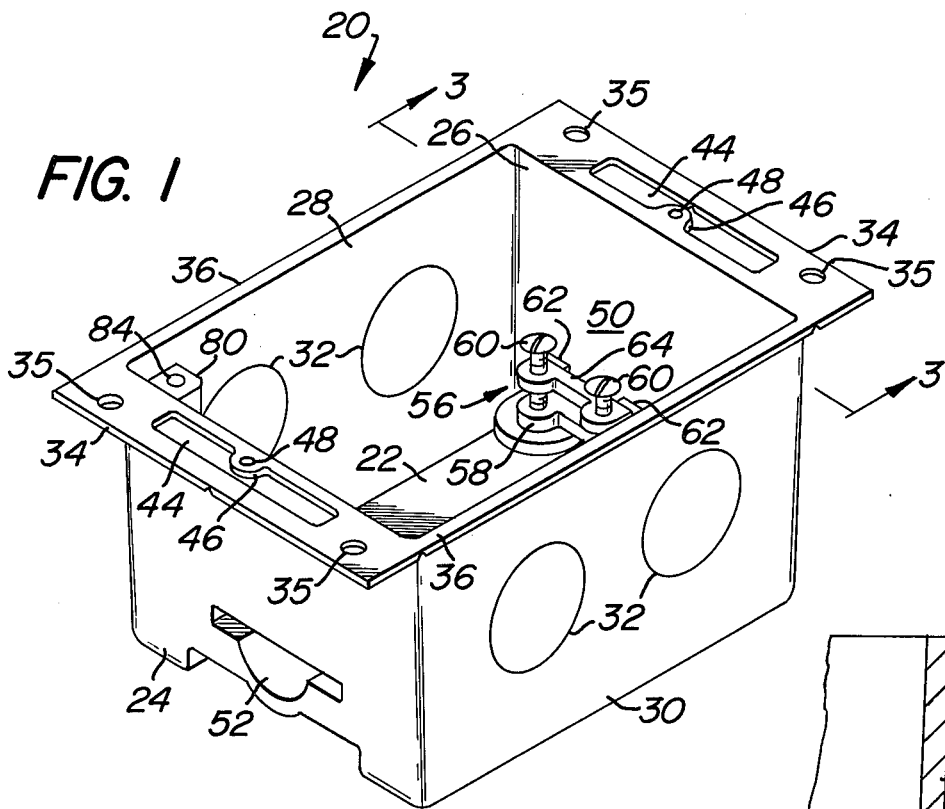
FIG. 1
FIG. 8
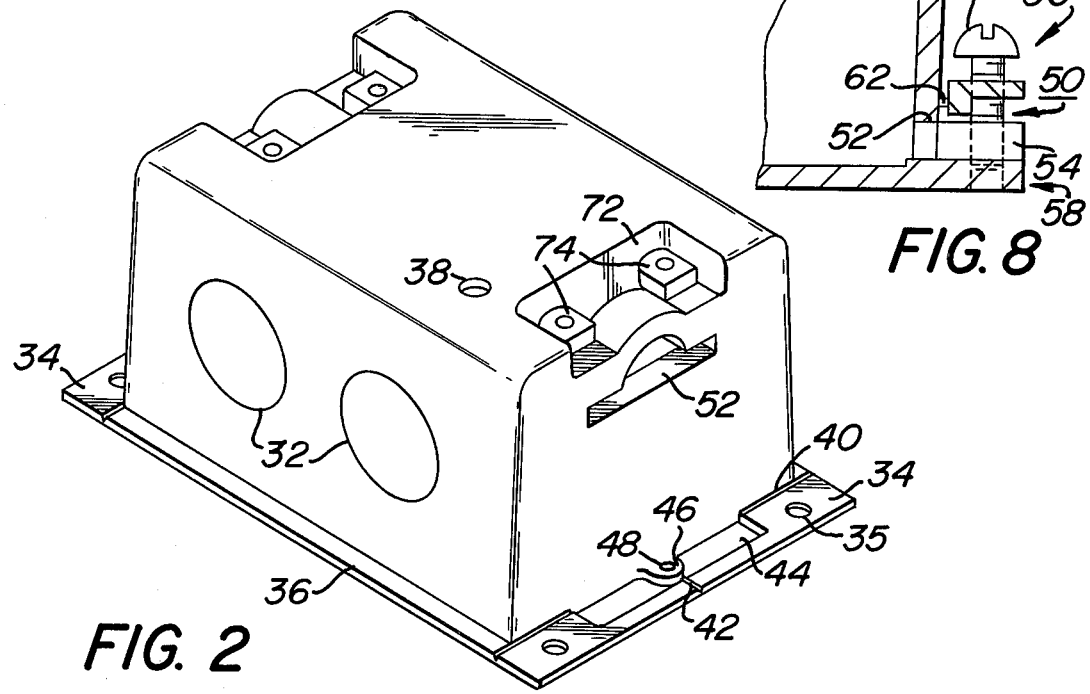
FIG. 2

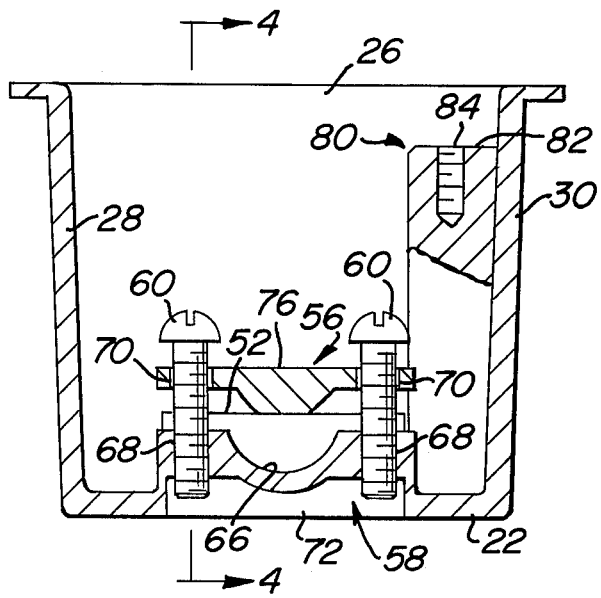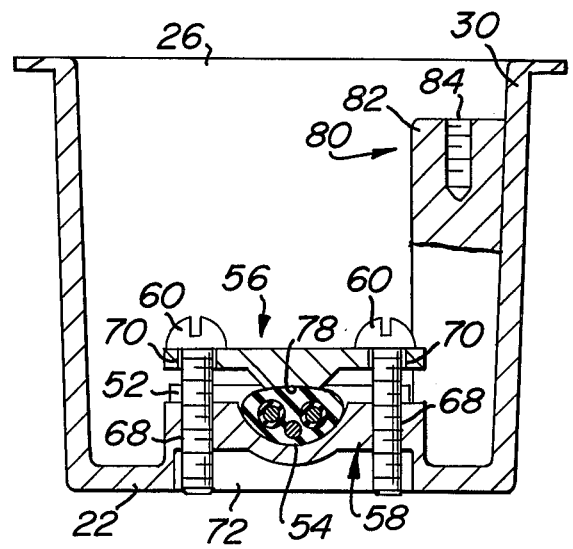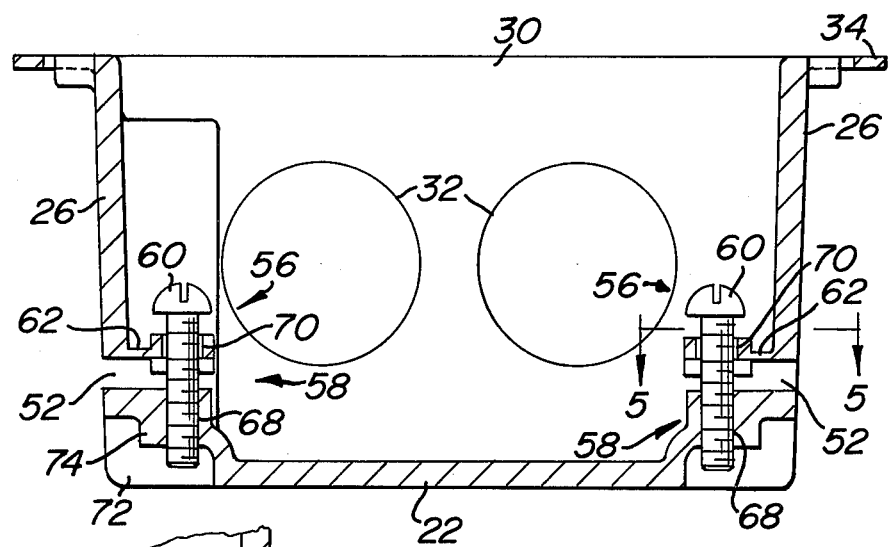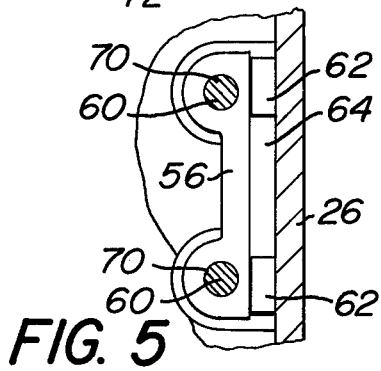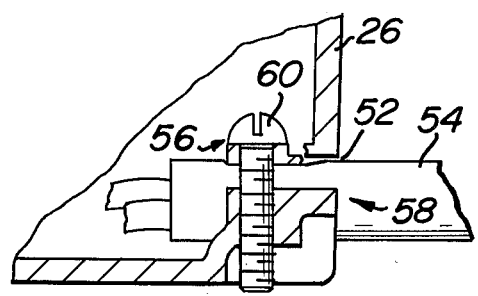

ELECTRICAL JUNCTION BOX

This invention relates generally to boxes for use in electrical wiring systems and more particularly to boxes having clamping means for securing the ends of conductors, conduits and the like within the box.

Heretofore various electric junction boxes have been proposed in the patent literature and are commercially available. As is known, such boxes are generally hollow members including plural wall(s) including conductor-receiving openings therein. The boxes may be formed as an integral unit as by stamping or may be assembled from various components. Clamping means are usually provided to secure the ends of electric conductors in place within the openings so that the electrical connections made within the box will not be subject to disconnection.

Examples of prior art electrical boxes are shown in U.S. Pat. Nos. 1,473,812 (Clements), 2,659,765 (Dunn), 2,927,149 (Kern, Jr.), 3,084,958 (Appleton), 3,410,582 (Appleton) and 3,676,571 (Rubinstein).

While prior art electrical boxes with cable clamping means are generally suitable for the purpose for which they are intended, such devices nevertheless leave much to be desired from the standpoint of ease and speed of use.

In addition, prior art electrical boxes have been characterized by the use of clamping components which are separable from the box. For example, the box of the Clements patent makes use of a serrated plate which is connected to the box by a screw and which is adjusted to clamp the conductor in place. The box of the Dunn patent utilizes a pair of opposed clamping members which are connected together by a pair of screws which include flanges extending into openings in the box to hold the clamping members in place. The boxes of the Appleton patents and the box of the Rubinstein patent incorporate what is perhaps the most common type of cable clamps in use today, namely, a separate plate or shoe including at least one cable receiving recess and which is connected to the interior of the box by a screw, with the cable to be clamped in the recess between the plate and the box.

The separable component clamps of the junction boxes of the prior art present several problems, the most serious of which being that during storage, shipment, etc., the clamps may come loose and even be lost. In such an event the user must either reconnect the disconnected part or else get a replacement if the part is lost. For the occasional user, such action may only be a slight inconvenience, but in large scale construction applications the time lost by skilled workmen (e.g., electricians, etc.) can result in substantial increases in construction costs far disproportionate to the costs of the box itself.

In addition, several prior art electrical connection boxes are arranged to have their clamping means assembled at the job site. Needless to say, the necessity of assembling the clamp and box at the side can result in substantial time wasted and concomitantly increased construction costs.

It is accordingly a general object of the instant invention to provide an electrical junction box which overcomes the disadvantages of the prior art.

It is a further object of the instant invention to provide an electrical junction box having cable clamping means which is particularly suited for quick and easy use.

It is still a further object of the instant invention to provide an electrical junction box having clamping means which is formed as an integral unit, thereby obviating accidental disconnection of the clamping means prior to the use of the box.

It is yet a further object of the instant invention to provide an electrical junction box whose clamping means is initially held in an open position to facilitate the insertion of a cable therein.

It is yet a further object of the instant invention to provide an integral electrical box with clamping means and which obviates the need for assembly of the box and clamping means prior to its use.

These and other objects of the instant invention are achieved by providing an electrical connection box. The box includes a hollow, integrally formed housing having at least one wall. The wall includes an opening in it which is configured to receive an electrical conductor therethrough into the interior of the box. Tightenable clamping means are provided adjacent to the opening for clamping the conductor in place. The clamping means includes a contact shoe integrally formed with the housing and being breakable therefrom at a break point when the conductor is to be clamped. The breakage of the contact shoe from the housing enables the shoe to be brought into clamping engagement with the conductor by the tightening of suitable means.

Other objects and many of the attendant advantages of this invention will be readily appreciated as the same becomes better understood by reference to the following detailed description when considered in connection with the accompanying drawing wherein:

FIG. 1 is a perspective view of an integral electrical connection or junction box of the instant invention and showing a portion of its interior;

FIG. 2 is a perspective view of the box of FIG. 1 and showing the exterior thereof;

FIG. 3 is a sectional view taken along line 3—3 of FIG. 1;

FIG. 4 is a sectional view taken along line 4—4 of FIG. 3;

FIG. 5 is a sectional view taken along line 5—5 of FIG. 4;

FIG. 6 is a sectional view of a portion of the box shown in FIG. 5 showing the clamping of a conductor in said box;

FIG. 7 is a view, similar to that of FIG. 3, but showing the clamping means of the box in use; and FIG. 8 is a side view, partially in section, showing an alternative embodiment of the box of the instant invention.

Referring now to the various figures of the drawing wherein like reference characters refer to like parts, there is shown at 20 in FIGS. 1 and 2 an electrical connection or junction box embodying the present invention. Box 20 generally comprises a housing having a back or bottom wall 22, a pair of end walls 24 and 26, and a pair of side walls 28 and 30.

The junction box is formed as an integral unit such as by either a molding or a die casting process. To that end, the box may be formed of lightweight, water resistant material, such as aluminum, aluminum alloys, and plastics, such as ABS (acrylonitrile-butadiene-styrene), polycarbonate, NYLON (a trademarked plastic of E. I. DuPont De Nemours & Co.), DELRIN (a trademarked plastic of E. I. DuPont De Nemours & Co.), etc.

As can be seen in FIGS. 1 and 2, the side walls 28 and 30 each include conventional knock-out plug portions 32, which, when removed, permit the introduction of one or more electrical conduits into the box.

The box as shown in FIGS. 1 and 2 is arranged for flush-mounting with respect to a wall, via the use of a pair of mounting flanges 34. To that end, one flange 34 projects outwardly from the end wall 24 of the box while the other flange projects outwardly from the end wall 26. Both flanges lie in the plane of the opening to the interior of the box. A pair of narrower flanges or lips 36 project from the side walls 28 and 30 and in the plane of flanges 34. Each of the flanges 34 include a pair of holes 35 through which mounting means (not shown) such as conventional screws, nails, bolts, etc., may extend to mount the box on a wall. In addition, as can be seen in FIG. 2, the bottom wall 22 includes at least one hole 38 for enabling the box to be mounted on a wall stud by such mounting means. Additional holes 38 may be provided in the bottom wall 28 and/or in the side and end walls 24, 26, 28 and 30, respectively, as desired.

Furthermore, additional mounting means (not shown), like the clips disclosed and claimed in my U.S. Pat. No. 3,659,036, whose disclosure is incorporated by reference herein, may be incorporated into the box 20 to facilitate the mounting of the box on a supporting surface.

In the event that the mounting flanges 34 are not needed for mounting the box 20, they may be removed therefrom. To that end, as can be seen in FIG. 2, each mounting flange 34 includes on its rear surface a weakened or break line 40 disposed parallel to the edge of the immediately adjacent end wall of the box. Removal of the flange 34 is effected by merely bending the flange out of its normally disposed plane such that the flange separates from the box along the weakened or break line 40. An additional break line 42 is provided in the flange perpendicular to the line 40. As can be seen in FIGS. 1 and 2, an elongated slot 44 is provided within each mounting flange 34. An ear or projection 46 extends into each slot, with each ear including a threaded hole 48. Each hole 48 is adapted to receive a screw for mounting one end of an electrical component such as a switch (not shown) or a duplex receptacle (not shown) onto the ear, with the component extending between the ears and in the box in a conventional manner. As can be seen, one side of slot 44 is colinear with break line 40 to further facilitate the removal of mounting flange 34 from the box 20. As will be appreciated by those skilled in the art, by breaking the flange 34 along a portion of the line 40 from the edge to the slot 44 and along break line 42 a half sized mounting flange with a single mounting hole 35 remains.

Like conventional junction boxes, box 20 includes means 50 for clamping electrical conductors which extend into the box in place therein. However, the clamping means 50 of the instant invention differs markedly from prior art clamping structure in that the clamping means 50 of the instant invention is integrally formed with the box 20. This feature obviates the assembly and/or disconnection and loss problems inherent in prior art boxes as described heretofore, while also facilitating the quick and easy clamping of the conductors.

The details of the clamping means 50 will be described in detail hereinafter, suffice for now to say that such means may be disposed within the hollow interior of the box 20, as shown in FIG. 1, or outside the box adjacent to the end wall, as shown in FIG. 8.

In either embodiment the clamping means 50 includes components which are integrally formed with the box.

As can be seen in FIGS. 1 and 2, the box 20 includes an opening 52 in each end wall 24 and 26. The openings 52 are configured to receive either the helical metal jacketed type cable (known in the art as BX cable) or the molded composition, oval jacketed type cable (known in the art as ROMEX cable). As will be appreciated by those skilled in the art, the openings 52 shown in the end walls 24 and 26 of the drawing herein are configured for the ROMEX type cable 54 (FIG. 7).

As can be seen in FIGS. 1, 3 and 4, each clamping means 50 basically comprises a clamping plate or shoe 56 and a back stop 58, which are each integrally formed with the box 20, and tightening members, such as screws 60. As will be described in detail hereinafter, the shoe 56 is adapted to be broken away from the side walls of the box and drawn toward the back stop 58 by the tightening of the screws 60 to clamp a cable interposed between the shoe and the back stop (see FIGS. 6 and 7).

Each shoe projects from the end wall 24 or 26 immediately above the opening 52 in the end wall of the box such that the opening is interposed between shoe 56 and back stop 58. Each shoe is connected to the side wall of the box by at least one reduced thickness portion 62. In the embodiment shown in FIG. 1, two such portions 62 are utilized and are separated by a slot 64. The reduced thickness portion 62 and the slot 64 together serve as a line along which the shoe 56 may be broken from the end wall to enable the cable 54 to be clamped in place within the box.

As shown in FIGS. 3 and 7, the back stop 58 comprises a raised portion projecting upward from the bottom wall 22 of the box 20. The inside surface of back stop 58, that is the surface within the interior of box 20, includes a semi-circular recess 66 contiguous with the like shaped portion of the opening 52 in the end wall and aligned therewith. The recess 66 is adapted to receive the ROMEX cable 54 therein as shown in FIG. 7. A pair of threaded holes 68 extend through the back stop on either side of the depression 66. A pair of holes 70 are provided in the shoe 56, with one hole being adjacent to one side of the shoe and the other hole being adjacent to the other side of the shoe. The holes 70 are axially aligned with the holes 68 in the back stop 58. Each tightening screw 60 extends through hole 70 and into hole 68, with the head of the screw being disposed adjacent to the shoe 56.

As shown clearly in FIG. 2, a recess 72 is provided in the bottom wall of the box 20 and underlying the shoe 56. The thickness of the back stop at portions contiguous with the threaded opening 68 is greater than at other portions of the back stop to form a pair of bosses 74 (FIG. 2). The recess permits the box to be mounted flush by its back wall without interference from the screws of the clamping means.

In accordance with one aspect of the instant invention the shoes 56 of boxes to be used for ROMEX type cable include the thickened central portion 76 forming a downwardly extending projecting surface 78. The surface 78 is adapted to make contact with and slightly deform the ROMEX jacket (see FIG. 7) when the tightening screws 60 are tightened as will be described hereinafter.

For BX type cables the shoe 56 is of a slightly different configuration and includes a recess (not shown) like recess 66 of back stop 58. Accordingly, the circular metal jacket of the BX type cable is seated within recess 66 of back stop 58 and the similar recess (not shown) in the shoe 56.

Use of the box 20 of the instant invention is as follows: the box is mounted using any of the mounting features set forth earlier, e.g., the mounting flanges 34, the holes 36, or the mounting clips (not shown) of U.S. Pat. No. 3,659,036. Until an electrical connection is to be made within the box each of the clamping means 50 of the box is in the state as shown in FIGS. 1, 3, 4, 5, 7 or 8. That is, the shoe 56 is integrally connected to the box 20. This feature is of considerable importance as it prevents disassembly and/or loss of the shoe and, in addition, positively holds the shoe in a spaced position from the back stop 58 to facilitate the insertion and securement of the cable. To that end, when connection of the cable is to be accomplished the end of the cable is inserted through opening 52 and between shoe 56 and back stop 58. The user then merely tightens the screws 60 to cause the shoe 56 to break from the side wall from which it is connected along its break line and to move toward the cable seated within the recess 66 of the back stop 58. Continued tightening of the screw 60 effects the positive securement of the cable between the shoe and the back stop.

As should be appreciated, since the shoe is initially held in place by the break line portion thereof and spaced from the back stop, the securement of the cable can be accomplished without necessitating the user to hold the shoe in one hand while tightening the screws with the other hand. Needless to say, this feature can be of significant importance, particularly in large scale wiring applications wherein substantial electrician's time would be saved.

In the embodiment shown in the drawing herein a grounding connector is provided. Needless to say, the boxes formed of insulating material, such as plastics, the grounding connector is eliminated.

As can be seen in FIGS. 1, 2 and 4, the grounding connector comprises a boss disposed at one corner of the box in the interior thereof and includes a top surface 82 lying close to but below the edge forming the mouth of the box. A tapped opening 84 is provided in the top surface 82 of the boss to receive a grounding screw (not shown). The positioning of the grounding screw adjacent to the mouth of the box facilitates the electrical grounding of the box.

In FIG. 8 there is shown an alternative embodiment of the clamping means 50, wherein said means is mounted on the outside of the box. To that end, the clamping means 50 includes a shoe 56 which projects outward from the end wall 26 of box 20 and is connected thereto by the pair of breakaway reduced thickness portions 62. The back stop 58 is spaced from the shoe 56 and extends outward from end wall 26, with opening 52 lying between it and shoe 56. A pair of tightening screws 60 extend through aligned openings in shoe 56 and back stop 58.

Use of clamping means 50 of FIG. 8 is identical to that of clamping means 50 of FIG. 1. To that end, the cable 54 is extended through opening 52 into the box for connection therein. The tightening screws 60 are then tightened to break the shoe from the end wall 26 and move the shoe into contact with the jacket of cable 54. Further tightening of screws 60 clamps the cable in place between shoe 56 and back stop 58.

In view of the foregoing it should be appreciated that the electrical connection box of the instant invention, being formed as an integral unit is simple in construction and can be manufactured inexpensively. In addition, the box offers several features facilitating its mounting in various types of applications and for facilitating the clamping and connection of cable(s) and other connectors within the box.

Without further elaboration, the foregoing will so fully illustrate my invention that others may, by applying current or future knowledge, readily adapt the same for use under various conditions of service.

What is claimed as the invention is:

1. An electrical connection box comprising a hollow, integrally formed housing having at least one wall, said wall including an opening therein configured to receive an electrical conductor therethrough and into the interior of the box and tightenable clamping means disposed adjacent to said opening for clamping said conductor in place, said clamping means including a contact shoe integrally formed with said housing and being breakable therefrom at a break point when said conductor is to be clamped to enable the shoe to be brought into clamping engagement with said conductor upon the tightening of said clamping means.

2. The box of claim 1 wherein said clamping means projects into said box.

3. The box of claim 1 wherein said clamping means projects out of said box.

4. The box of claim 3 wherein said clamping means includes at least one threaded fastener for effecting the breakage of said contact shoe from said housing and for tightening said contact shoe into clamping engagement with said conductor after said breakage.

5. The box of claim 4 wherein said opening is configured for receipt of a ROMEX type conductor therethrough.

6. The box of claim 5 wherein said housing includes at least one mounting flange integrally molded with said housing and being breakable therefrom at a break point.

7. The box of claim 6 wherein said box is formed of a plastic.

8. The box of claim 1 wherein said clamping means includes at least one threaded fastener for effecting the breakage of said contact shoe from said housing and for tightening said contact shoe into clamping engagement with said conductor after said breakage.

9. The box of claim 8 wherein said opening is configured for receipt of a BX type conductor therethrough.

10. The box of claim 9 wherein said housing includes at least one mounting flange integrally molded with said housing and being breakable therefrom at a break point.

11. The box of claim 10 wherein said box is formed of a metal.

12. The box of claim 11 additionally comprising a ground connector.

13. The box of claim 12 wherein said connector is a boss disposed within said housing and integrally formed with said box, said boss including a threaded opening adjacent to the mouth of said housing.

14. The box of claim 1 wherein said housing includes at least one mounting flange integrally molded with said housing and being breakable therefrom at a break point.

* * * * *